May 1, 1951     H. R. STRAIGHT     2,550,947
APPARATUS FOR SOLVENT EXTRACTION OF OIL FROM SEEDS
Filed March 5, 1946     2 Sheets-Sheet 1
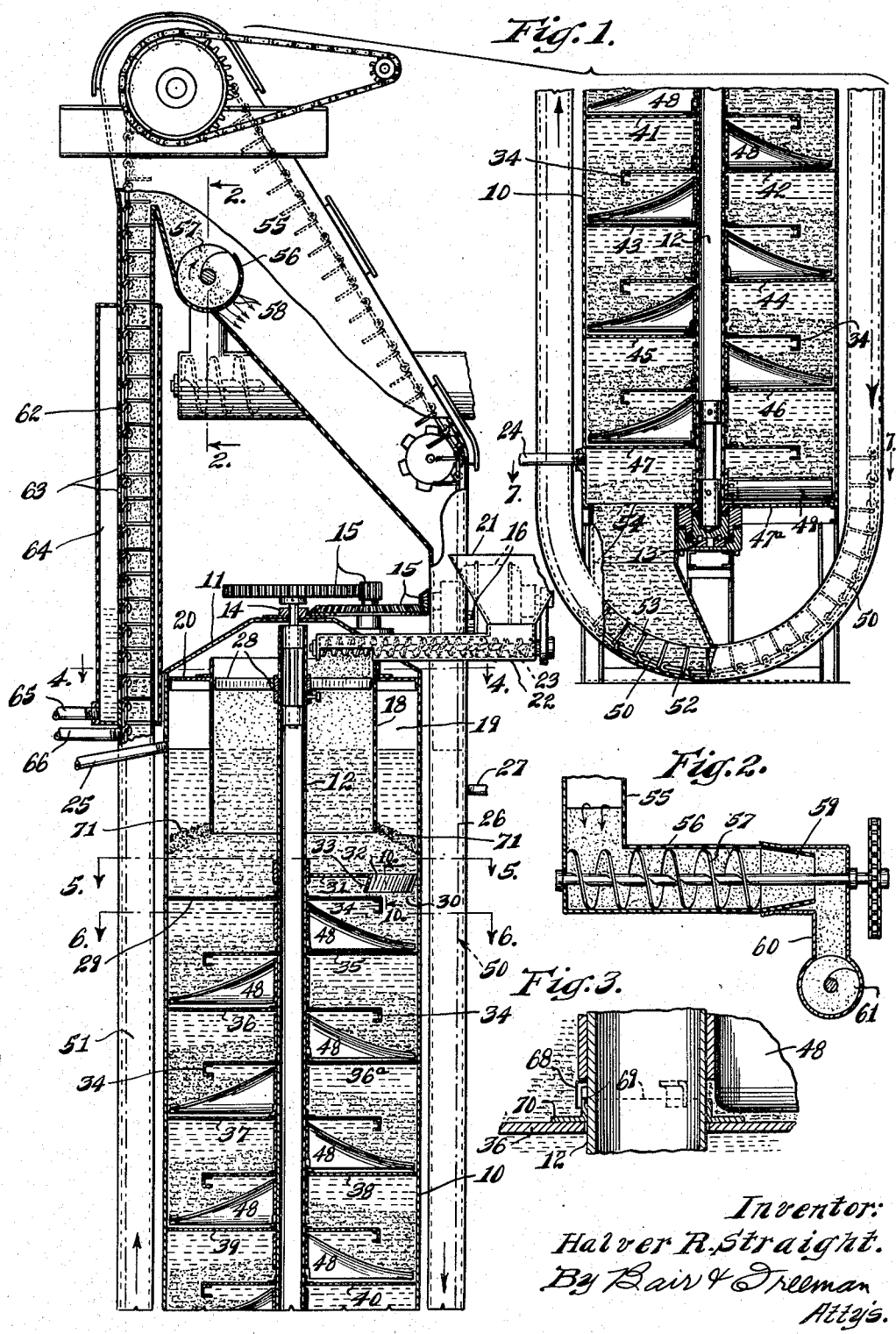
Inventor:
Halver R. Straight.
By Bair & Freeman
Attys.

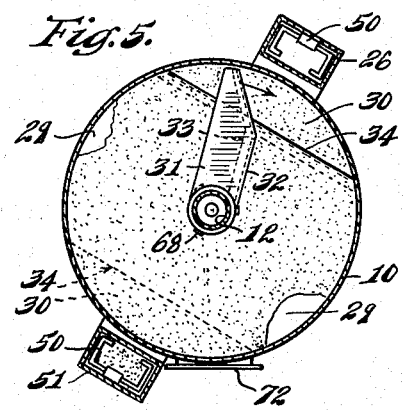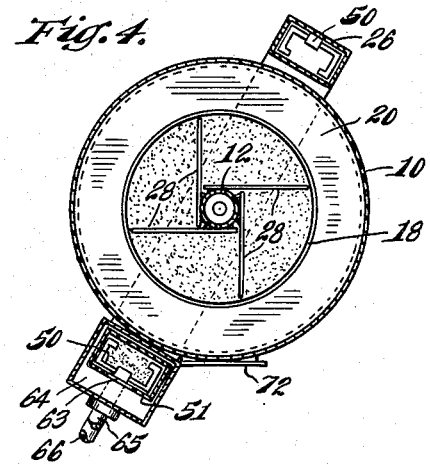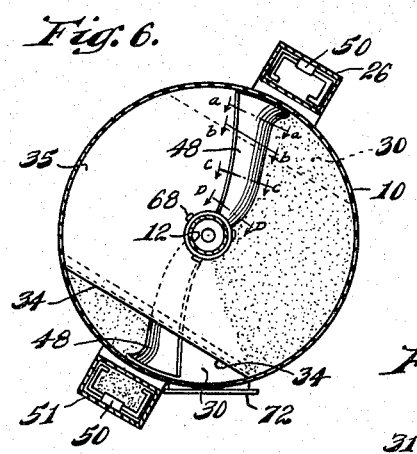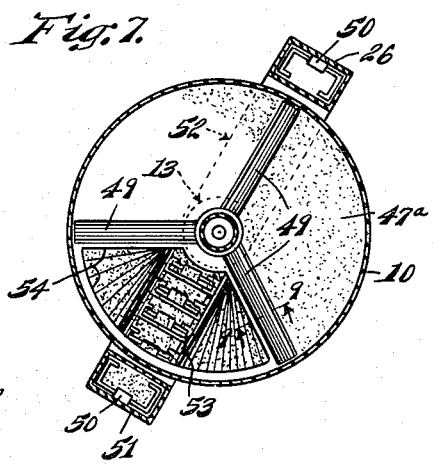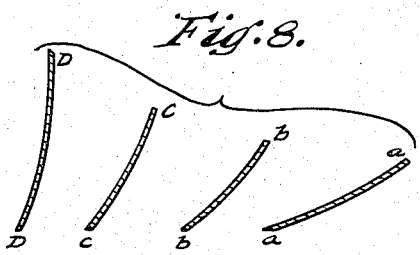
Inventor:
Halver R. Straight.
By Bair & Freeman
Attys.

Patented May 1, 1951

2,550,947

UNITED STATES PATENT OFFICE 2,550,947

APPARATUS FOR SOLVENT EXTRACTION OF OIL FROM SEEDS

Halver R. Straight, Adel, Iowa

Application March 5, 1946, Serial No. 652,148

3 Claims. (Cl. 23—270.5)

My invention relates to an apparatus of the tower type, and to a method, for extracting from soy beans and other oil bearing seeds by use of a solvent.

It is my purpose to provide apparatus including an extraction tower to which solvent is supplied at the bottom and flaked soy beans or the like are supplied at the top, so that oil may be extracted from the flakes as they travel downwardly. The flakes are removed from the bottom of the tower and the solvent from the top, thereby using the counter-flow method for accomplishing the extraction of a maximum of the oil.

In order that the flakes and particles of various sizes and thicknesses may be retained in the extractor sufficiently long, and in order that all the flakes and particles may be adequately exposed to the action of the solvent, I provide a series of vertically spaced shelves in the tower so arranged that the flakes discharge downwardly from the successive shelves at opposite sides of the tower for insuring proper travel of the flakes and the certainty of uniform exposure of all of them to the solvent.

I provide revolving sweeps on a rotating shaft, arranged vertically centrally in the tower. The shelves are arranged to afford successively diametrically opposite openings through which the flakes may travel downwardly.

Adjacent the openings the shelves are provided with downwardly projecting parallel short platelike faces. Above the top shelf I provide a special sweep, the details of which are hereinafter more fully explained. Above the other shelves I arrange knives carried by the shaft, which knife or sweeps are of novel structure.

One of the special objects of my invention is to provide a method and structure for preventing the escape of flakes and particles with the solvent flowing from the extractor. This method and structure provide for the automatic formation of a filter layer of fine flour and the like through which the solvent passes, but which prevents the passage of fine particles and seed flakes.

Another special object of my invention is to provide a method and means for better rinsing out the oil by supplying the solvent hot and under pressure into an elevator casing at a point below a drainage screen through which the miscella passes away from the flakes.

Another object of my invention is to provide a seal around the shaft to prevent oil flow upwardly therearound.

With these and other objects in view, my invention consists in the method, and in the construction, arrangement and combination of the various parts of my device, whereby the objects contemplated are attained, as hereinafter more fully set forth, pointed out in my claims and illustrated in the accompanying drawings, wherein:

Figure 1 is a sectional view through the tower, illustrating operating parts. On account of the vertical length of the drawing necessary for illustrating the parts, the lower section of the tower is shown on the right.

Figure 2 is a vertical sectional view taken on the line 2—2 of Figure 1 illustrating the wringer for the spent flakes discharged from the elevator which carries the flakes and miscella from the bottom of the tower.

Figure 3 is a vertical sectional view of a portion of the shaft and one shelf and one sweep knife, and particularly illustrating the seal around the shaft.

Figure 4 is a horizontal sectional view taken on the line 4—4 of Figure 1 illustrating particularly the sweep arms for leveling the flakes as they are fed into the tower.

Figure 5 is a horizontal sectional view taken on the line 5—5 of Figure 1 and looking downwardly at the top shelf and its sweep arm.

Figure 6 is a horizontal sectional view taken on the line 6—6 of Figure 1 looking down on one of the lower shelves and its sweep arm.

Figure 7 is a horizontal sectional view taken on the line 7—7 of Figure 1 looking down on the spider sweep at the bottom of the tower.

Figure 8 is a view illustrating sections of one of the sweep knives, the sections being taken on the lines indicated in Figure 6.

Figure 9 is a sectional view taken on the line 9—9 of Figure 7 to illustrate the structure of the spider sweep.

Figure 10 is a vertical sectional view of the top sweep blade taken on the line 10—10 of Figure 1.

I have used the numeral 10 to indicate generally the tower in which oil is extracted from soy bean or other oil bearing seed flakes by a counter-flow of a suitable solvent. The solvent is a hydrocarbon product of well known character, such, for instance, as hexane. The tower may be of suitable size, for example, ten feet in diameter. It may have a dome-like top 11.

A tubular shaft 12 is arranged centrally in the tower with suitable anti-friction bearings 13 at the bottom of the tower and suitable bearing 14 at the top of the tower. The shaft is rotated through gearing 15 from a motor 16. Mounted in the tower just below the top 11 is a tube or cylinder 18 concentric with the tower and spaced inwardly from the wall thereof to afford an annular surrounding chamber 19. This chamber is closed at the top by an annular plate 20.

The oil bearing seeds, such as soy beans, are pressed into flakes. These flakes are supplied to the inside of the tube 18 at the top thereof from a hopper 21 which feeds the flakes to a horizontal conveyor casing 22 in which is a screw conveyor 23 operated from the motor 16.

Fresh solvent is pumped to the bottom of the tower 10 through a pipe 24.

At the upper part of the tower 10 is a take-off pipe 25 through which the oil-laden solvent or miscella is discharged from the tank. This take-off pipe is located between the top and bottom of the tube 18 as clearly shown and determines the fluid level in the tower. From the pipe 25 the miscella goes to the filter where the oil is further clarified before going into the evaporators where the solvent is removed from the oil in a conventional manner, not shown.

Leveling sweep

It is desirable for various reasons that the dry flakes in the upper part of the tube 18 should be leveled off so that there is always a dry layer above the solvent level.

To this end leveling sweep arms 28 are fixed to the shaft 12 in the upper part of the tube 18 as shown in Figures 1 and 4. The dry flakes settle into the fluid at the level determined by the pipe 25 and pass downwardly through the fluid in the tube 18 to the lower end of that tube and down to the top shelf 29 located a short distance below the tube 18.

Shelves and sweeps

All the shelves are in the form of disks with segments cut away to leave openings 30. The shelves are so arranged that the openings 30 are successively on opposite sides of the tower so that as the flakes travel downwardly in the tower, they fall on the successive shelves and travel from one side of the tower to the other, through the upflowing solvent.

Fixed to the shaft 12 above the top shelf 29 is a radially extending arm 31 and on the outer end of that arm is a sweep blade 32. For reasons which will be more clearly apparent hereinafter, it is desirable that the sweep blade 32 shall not have any tendency to push the flakes upwardly any more than can be avoided. To that end the sweep 32 has a flat, front face and a cover plate extending rearwardly from its upper edge and slightly downwardly, as indicated at 33 in Figure 10.

Each shelf has along its edge adjacent the hole 30, a downwardly projecting plate-like face 34 which may be formed by securing a channel bar to the bottom of the shelf adjacent the hole.

Below the shelf 29 are successively spaced shelves 35, 36, 36a, 37, 38, 39, 40, 41, 42, 43, 44, 45, 46, 47 and 47a, which are similar to the shelf 29 with the openings 30 alternating on opposite sides of the tower.

Secured to the shaft 12 above each of the respective shelves 35 to 47, is a peculiarly-shaped sweep blade or knife 48. The sweep blades 48 are successively arranged on opposite sides of the shaft 12 so that each sweep 48 is diametrically opposite the next lower sweep 48. The sweeps 48 incline from the shaft 12 radially outward and slightly rearwardly with respect to their direction of advance around the tower, except that at their outer ends they are inclined ahead and brought to a dull edge with a little relief on their rear sides.

This structure prevents development of outward pressure and thus prevents packing the flakes against the tower wall. Since there is relief on the back side of the blade 48 at its outer end, any flakes passing around the outer end of the sweep 48 will not be subject to pressure and packing which might otherwise build up a rubber-like mass of flakes, which mass might require excessive power for thereafter operating the sweep and might cause backing of the sweep in time.

The sweeps 48 are also inclined from their lower to their top edges slightly rearwardly, and the inclination is greatest at the outer end of each sweep blade as illustrated in Figure 8. The shape of these blades tends to cause the flakes of soy beans or the like to be swept off the entire shelf and helps to prevent dragging bodies of the flakes around and around, close to the shaft.

Fixed to the shaft 12 above the bottom shelf 47a are two or more equi-distantly spaced horizontal sweep arms 49 which, in cross section, are curved from their lower edges upwardly and rearwardly with relation to their direction of advance as illustrated in Figure 9.

Conveyor

An endless conveyor 50 is arranged with its down leg 26 on one side of the tower and its up leg 51 on the other side of the tower. The conveyor has a portion 52, traveling through the lower part of the tower. The top part of the casing of the conveyor portion 52 is removed as at 53 to permit the flow of flakes into the conveyor as they flow downwardly over the edge of the bottom shelf.

The opening 54 at the edge of the bottom shelf 47a is larger than the openings 30 to allow full and free discharge of the flakes to the conveyor. The opening 54 may be on the side of the tower opposite to that illustrated, if desired.

Wringer

The conveyor portion 51 having the upwardly traveling leg of the conveyor, projects above the tower 10 and discharges the flakes into a chute 55 where they fall into the wringer 56 comprising a transverse trough-like member in which is a screw conveyor 57. The wall of the wringer 56 is perforated at 58 to permit miscella squeezed from the flakes to fall into the lower part of the chute 55 and from thence to the down leg 26 of the conveyor.

In order to squeeze the flakes and force out the miscella, there is provided at the discharge end of the wringer 56 a tapering sleeve 59 through which the spent flakes are forced by the conveyor into a chute 60 from which they are carried to a conveyor 61 to a drier.

Drainage section

Ahead of the wringer 56 the conveyor has what may be called a drainage section 62. In this section 62 the casing of the conveyor leg 51 is perforated as indicated at 63 to permit the flow of miscella into a chamber 64. A pipe 65 carries the miscella and solvent of low oil content drained from the flakes to the down leg 50 of the conveyor.

In order to rinse out any miscella or solvent which may have been freed from the flakes as they are carried up by the elevator through the drainage section, solvent is forced under pressure into the conveyor leg 51 through a pipe 66 communicating with the leg 51 below the drainage section. The solvent is pumped through the pipe 65 under some vacuum.

I find that by forcing the solvent into the casing or elevator leg 51 hot and under pressure, I can build up the temperature in the lower part of the drainage section to a point above the boiling temperature of the solvent, and get a better rinsing action.

I find also that by pumping through the pipe 65 under some vacuum, the boiling temperature of the solvent can be lowered so that the solvent with some oil content picked up in coming up the elevator, is pulled out of the flake beds carried by the elevator elements and the flake bed can be somewhat dried, due to the drop in boiling temperature caused by the lowering of pressure by the pump below atmospheric pressure. In this way I can accelerate the drying action of the heating elements in the drier (not shown) used to evaporate the solvent after it leaves the extractor system and passes through the filter and can also increase the toasting effect on the flakes in their drying by another drier, not shown.

Shaft seal

To reduce flow of solvent upwardly around the shaft through the shelves and consequent tendency to channel, I provide a seal for each shelf in the form of an annular floating ring 70 resting loosely and having an upturned flange 69, and held in place by angle bar retainers 68, each having a part overlapping the upturned flange 69 on a floating ring.

Filter formation

An important feature of my invention, achieved by reason in part at least, by the tube 18, is the formation of an annular filter bed around the lower edge of tube 18 between that tube and the wall of the tower.

At the beginning of the operation of the apparatus I find that there gradually builds up between the lower edge of the tube 18 and the wall of the tower 10 a filter bed 71 of flour-like particles from the flakes. By selecting a proper cross section of the tube 18, there is provided the settling compartment 19 outside that tube in which the velocity of the upward flow of the oil-laden miscella may be kept sufficiently low so that the fall rate of the fine particles in the miscella, which tend to be carried upwardly from the flake bed through the settling chamber, is greater than the velocity of flow of the miscella upward so that the fine particles accumulate around the lower edge of the tube and form a filter bed. After a time a substantial filter bed 71 is formed and thereafter this acts as a filter to retain and prevent upward flow of small particles.

I find that the filter bed is automatically self-compensating and self-maintaining. If there happens to be for an instance a little less resistance in any part of this filter bed, fine particles tend to accumulate more at that point, until a balance is reached throughout the filter bed 71. A certain thickness of fines or flour is accumulated in this bed above the flakes. Progressively very small particle sizes tend to clot the openings through the filter bed, the velocity and pressure heads of the miscella moving upward tends to lift the flour upward slightly until a suitable thickness of flour is accumulated. A filter of fines is thereby established and maintained and this filter bed prevents the upward flow of very fine particles of flour with the outflowing miscella. I thus get a miscella almost perfectly filtered.

The fact that the miscella travels upwardly through this filter bed entering the lower surface and emerging through the upper surface of the filter, seems to make the filter work more freely than any others known to me.

Glass-protected sight openings 72 may be provided at convenient points in the tower wall, for instance, opposite the shelves, for observing the flow in the tower (Figure 5).

Operation

In the operation of my apparatus and in the practice of my method, the solvent is kept continually in motion with an upward flow.

The seed flakes are supplied from the hopper 21 to the conveyor 22 from which they are discharged into the upper end of the tube 18 where they are leveled off by the leveling sweep arms 28 and drop into the solvent in the lower part of the tube 18. From thence they flow downwardly over the successive shelves and are discharged over the bottom shelf 47a into the conveyor by which they are carried into the drainage section, and thence to the wringer.

After a short period of operation the filter bed forms itself and thereafter prevents the flow of fine particles down to nearly micron size into the chamber 19.

Fresh hot solvent is pumped under pressure into the up-traveling leg 51 of the conveyor just below the drainage section chamber 64. In the drainage section, solvent flows out through the opening 63 and is pulled off under slight vacuum through the pipe 65, and discharged through a pump or by gravity into pipe 27 and into the down leg 26 of the conveyor 50.

It is of course my purpose to cover by my claims any modification in structure for practice of my method which may be reasonably included within their scope and the scope of my invention. Similar subject matter is shown in my co-pending application, Serial Number 729,691, filed February 20, 1947, now Patent No. 2,517,143, claiming various improvements over the present application.

I claim as my invention:

1. In a solvent extraction apparatus, a vertical tower, a tubular member in the tower adjacent the top thereof, said tubular member forming an annular space with the wall of the tower, said tower having an opening for feeding oil-bearing flakes through said tubular member into the tower, a plurality of vertically spaced plates in said tower below said tubular member, said plates having alternately staggered openings therein, a vertical rotatable shaft in said tower extending through said plates and through said tubular member, a leveling sweep secured to said shaft in said tubular member adjacent the top thereof, a first sweep arm secured to said shaft above and adjacent the uppermost plate, an additional sweep arm secured to said shaft above and adjacent each of the remaining ones of said plates, each of said additional sweep arms having a face increasingly inclined away from the shaft to its outer end, and from its lower edge upwardly and away from its advancing direction, said tower having an opening adjacent its bottom for withdrawing flakes therefrom, and said tower having openings for respectively feeding solvent into the tower and withdrawing solvent from the tower.

2. In a solvent extraction apparatus, a vertical tower, said tower having an opening adjacent its top for feeding oil-bearing flakes thereinto, a plurality of vertically spaced plates in said tower, each plate having an opening therein, a vertical rotatable shaft in the tower extending through said plates, a sweep arm secured to said shaft above and adjacent each shelf, each sweep arm having a face increasingly inclined away from the shaft to its outer end, and from its lower edge upwardly and away from its advancing direction, said tower having an opening adjacent its bottom for withdrawing flakes therefrom, and said tower having openings for respectively feeding solvent into the tower and withdrawing solvent from the tower.

3. In a solvent extraction apparatus, a vertical tower, said tower having an opening adjacent its top for feeding oil-bearing flakes thereinto, a plurality of vertically spaced plates in said tower, each plate having an opening therein, a vertical rotatable shaft in the tower extending through said plates, a sweep arm secured to said shaft above and adjacent each shelf, each sweep arm being inclined slightly rearwardly, with respect to the direction of rotation, from the shaft toward its outer end, and inclined forwardly to a dull edge at its outer end to prevent packing of the flakes against the tower wall, said tower having an opening adjacent its bottom for withdrawing flakes therefrom, and said tower having openings for respectively feeding solvent into the tower and withdrawing solvent from the tower.

HALVER R. STRAIGHT.

REFERENCES CITED

The following references are of record in the file of this patent:

UNITED STATES PATENTS

| Number | Name | Date |
| --- | --- | --- |
| 1,114,018 | Moore | Oct. 20, 1914 |
| 1,793,465 | Coahran | Feb. 24, 1931 |
| 2,156,236 | Bonotto | Apr. 25, 1939 |
| 2,187,890 | Pattee | Jan. 23, 1940 |
| 2,276,298 | Frazier | Mar. 17, 1942 |
| 2,377,976 | Singer | June 12, 1945 |